June 24, 1924.

M. HOKANSON

SHOVEL MAKING

Filed Dec. 6, 1923

1,499,174

INVENTOR
MARTIN HOKANSON

ATTORNEYS

Patented June 24, 1924.

1,499,174

UNITED STATES PATENT OFFICE.

MARTIN HOKANSON, OF DULUTH, MINNESOTA, ASSIGNOR TO MARSHALL-WELLS COMPANY, OF DULUTH, MINNESOTA, A CORPORATION OF NEW JERSEY.

SHOVEL MAKING.

Application filed December 6, 1923. Serial No. 678,979.

*To all whom it may concern:*

Be it known that I, MARTIN HOKANSON, a citizen of the United States, resident of Duluth, county of St. Louis, and State of Minnesota, have invented certain new and useful Process of Shovel Making, of which the following is a specification.

My invention relates to the process of making shovels, spades and scoops and particularly relates to the formation of the shovel blade and the manner of mounting the handle thereon.

In the manufacture of shovels, spades and scoops considerable attention has theretofore been given to devising different ways of making the shovel blade more durable; that is, increasing its wearing qualities. Blades have been made of different kinds of metal and treated in different ways to harden the metal and make it less susceptible to wear. Machines have been devised for testing the wearing qualities of the blades until as far as durability is concerned, they are now at about the maximum of efficiency. I have noted, however, that a large number of shovels are discarded when the blades are scarcely worn at all as a result of the handle being broken at the point where it joins the blade, as by the separation of the weld, or the socket or shank to which the handle is secured is broken off at the point where it unites with the blade of the shovel. Evidently when such a breakage occurs, the shovel is worthless even though the blade itself is practically new. A shovel, therefore, is no stronger than its weakest point and if it is easily broken at the junction of the handle and shank or where the shank unites with the blade, there is no advantage in having a blade of maximum wearing qualities. The shovel is discarded when the shank or the handle is broken. I have found in railroad work particularly that shovels are subjected to very severe strains, being used for prying and lifting as in tamping ties and frequently the workmen instead of using a bar to lift a railroad rail will move it with their shovels, and instead of taking a pick or some other suitable tool for dragging a tie lengthwise they will often strike the edge of the shovel into the surface of the tie and pull it out of a pile or from under the rails. Evidently the ordinary shovel will not stand up under such use and while some shovels are reinforced against a downward prying pressure on the handle, they are not at all prepared to resist downward stresses which tend to separate the shank from the blade or lateral pressure on the handle, which is incurred when the edge of the blade is driven into a tie. The objects, therefore, of my invention, are, To provide a process of shovel making which will eliminate the weak points incidental to shovel blades and shanks as usually made.

The invention consists generally in the process of shovel making all as hereinafter described and particularly pointed out in the claims.

In the accompanying drawing.

Figure 1:
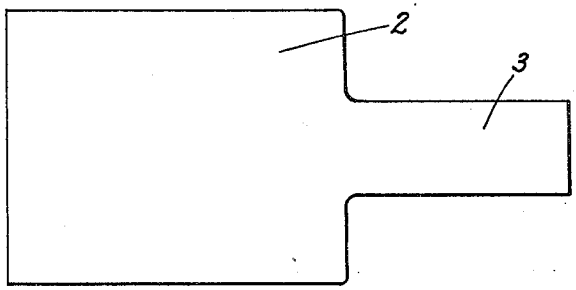
Figure 1 is a view of the shovel blade blank.
Figure 3:
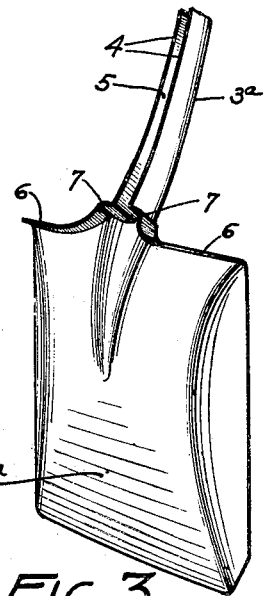
Figure 3 is a rear view of the same.
Figure 2:
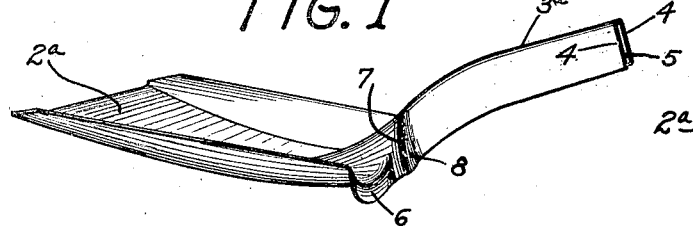
Figure 2 is a perspective view of a shovel blade and shank after the application of a die to the blank.
Figure 4:
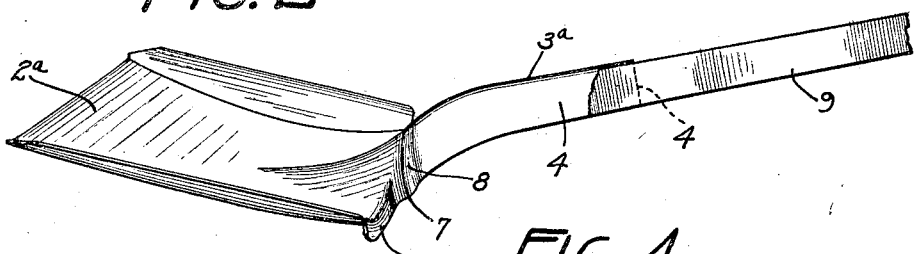
Figure 4 is a perspective view showing a reinforcing blade fitted into the shovel shank.
Figure 5:
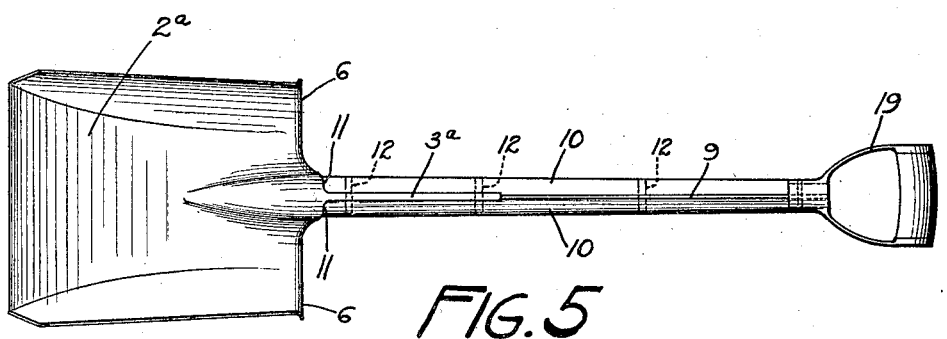
Figure 5 is a plan view showing the completed shovel.

In carrying out my improved process, I provide a blank 2 of sheet metal having at one end a centrally arranged integral extention 3 that is folded longitudinally in shaping the blade 2ª to form a shank 3ª having flanges 4 in opposing parallel relation with a space 5 between them. These flanges are formed by bending the extension longitudinally along a center line at the same time the metal is pressed to shape the blade. A foot-engaging flange 6 is formed by the action of the die on the end of the blade upon each side of the shank and the inner ends of these flanges merge into and are integral with the flanges 4 of the shank. At the junction of the blade and shank flanges I preferably provide angular shoulders 7 formed by bending the material so that it will have a bracing stiffening effect at this point and resist stresses on the shank which would normally tend to break the connection between the shank and the blade. Between the shoulders 7 and the walls of the flanges 4, inclined surfaces 8 are formed; on one side merging into the flanges of the shank and on the other joining the shoulders 7 and cooperating therewith to form a continuous integral wall between the foot-engaging flanges of the blade and the walls of the shank. I have found that a shovel shank pressed out in this way and integrally joined with the blade will resist any stress to which the shank and blade may be subjected and instead of becoming broken or separated from the blade at their junction, as frequently happens in shovels made in the ordinary way, the shank and blade will be perfectly rigid under all conditions of use. The connecting walls between the shank and the blade will be just as strong as any part of the blade and the shank will be so braced and supported that the shovel cannot be broken at this point by severe stresses. The gap between the flanges 4 is utilized to receive a reinforcing plate 9 fitted therein after which the flanges are pressed together to hold the plate in position. When this has been done, the wood sections 10 of the handle are fitted to the shank on each side with the ends of the sections abutted at 11 against the surfaces 8 and the handle sections are then firmly secured together to and through the shank by suitable means such as rivets 12.

I have shown this manner of shaping the blade and shank applied to a shovel but it will be understood that the same process may be utilized in the manufacture of spades or scoops. The merging of the integral flange and shoulder with the shank and blade provides a durable and extremely rigid connection that is not found in shovels as usually made.

I claim as my invention:

1. A method of forming a shovel, scoop or spade which consists in pressing the blade from a plate of sheet metal having a centrally arranged longitudinal extension at one end, bending said extension lengthwise to form a seat for the wood handle, bending the end of said plate to form foot-engaging flanges upon each side of said extension with the walls of said extension at its inner end outwardly curved and merging into said flanges.

2. A method of forming a shovel, scoop or spade which consists in pressing the blade from a plate of sheet metal having a centrally arranged longitudinal extension at one end, folding said extension lengthwise to form opposing substantially parallel flanges spaced apart and bending the end of said plate to form foot-engaging flanges upon each side of said extension, with the inner walls of said extension outwardly curved, and merging into said flanges.

3. A method of forming a shovel, scoop, or spade which consists in pressing the blade from a plate of sheet metal, having a centrally arranged longitudinal extension at one end, folding said extension lengthwise to form opposing substantially parallel flanges spaced apart, bending the end of said plate to form foot-engaging flanges upon each side of said extension, with the inner walls of said extension outwardly curved and merging into said flanges, and forming integral reinforcing handle-abutting shoulders at the junction of said walls and flanges.

4. A method of forming a shovel, scoop or spade, which consists in pressing the blade from a plate of sheet metal having an integral longitudinal extension at one end, folding said extension lengthwise to form opposing substantially parallel flanges spaced apart with outwardly curved walls at the junction of said flanges and blade, placing a reinforcing blade between said flanges, fitting separable wood handle sections to the outer faces of said flanges with the ends of said wood sections abutting said curved walls and finally securing said wood sections and said blade together through said flanges.

In witness whereof, I have hereunto set my hand this 17th day of November, 1923.

MARTIN HOKANSON.